United States Patent
Qi et al.

(10) Patent No.: US 9,244,406 B2
(45) Date of Patent: Jan. 26, 2016

(54) NANOTUBE REINFORCED FLUORINE-CONTAINING COMPOSITES

(75) Inventors: Yu Qi, Oakville (CA); Nan-Xing Hu, Oakville (CA); Qi Zhang, Mississauga (CA); Gordon Sisler, St. Catharines (CA); Brian McAneney, Burlington (CA)

(73) Assignee: XEROX CORPORATION, Norwalk, CT (US)

( * ) Notice: Subject to any disclaimer, the term of this patent is extended or adjusted under 35 U.S.C. 154(b) by 304 days.

(21) Appl. No.: 12/245,850

(22) Filed: Oct. 6, 2008

(65) Prior Publication Data

US 2010/0086787 A1 Apr. 8, 2010

(51) Int. Cl.
*B29D 22/00* (2006.01)
*G03G 15/20* (2006.01)
*C09D 127/16* (2006.01)
*C08L 27/18* (2006.01)

(52) U.S. Cl.
CPC .......... *G03G 15/2057* (2013.01); *C09D 127/16* (2013.01); *C08L 27/18* (2013.01); *C08L 2205/02* (2013.01); *Y10T 428/3154* (2015.04)

(58) Field of Classification Search
CPC ... C08L 27/18; C08L 2205/02; C09D 127/16; G03G 15/2057
USPC ........................................................ 428/35.7
See application file for complete search history.

(56) References Cited

U.S. PATENT DOCUMENTS

| | | | |
|---|---|---|---|
| 6,923,533 B2 * | 8/2005 | Pan et al. | 347/103 |
| 6,927,006 B2 | 8/2005 | Finn et al. | |
| 7,205,513 B2 * | 4/2007 | Pan et al. | 219/619 |
| 7,732,029 B1 | 6/2010 | Moorlag et al. | |
| 2003/0018130 A1 | 1/2003 | Dvornic et al. | |

(Continued)

FOREIGN PATENT DOCUMENTS

| | | |
|---|---|---|
| CA | 2530471 | 2/2005 |
| CA | 2614702 | 3/2012 |

(Continued)

OTHER PUBLICATIONS

Gervasi et al., "Functional Surfaces Comrpised of Hyper Nanocomposites (HNC) for Marking Subsystem Applications", U.S. Appl. No. 12/603,750, filed Oct. 22, 2009.

(Continued)

*Primary Examiner* — James Yager
(74) *Attorney, Agent, or Firm* — MH2 Technology Law Group LLP

(57) ABSTRACT

Exemplary embodiments provide coating compositions having pseudo-fluorine surface and methods for processing and using the coating compositions. The coating composition can include, for example, a plurality of fluorine-containing resin fillers and a plurality of nanotubes (e.g., carbon nanotubes (CNTs)) dispersed in a polymer matrix that contains, e.g., one or more cross-linked polymers. The fluorine-containing resin fillers can provide a pseudo-fluorine surface for a low surface energy of the coating composition. The nanotubes can be dispersed in the polymer matrix to provide an improved mechanical robustness of the coating composition. The coating composition can be coated on a member surface, wherein the coated member can be, for example, a fuser member, a fixing member, a pressure roller, or a release agent donor member, used in an electrostatographic printing device or process.

20 Claims, 2 Drawing Sheets

(56) References Cited

U.S. PATENT DOCUMENTS

| | | |
|---|---|---|
| 2006/0292360 A1 | 12/2006 | Hays et al. |
| 2007/0031639 A1 | 2/2007 | Hsu et al. |
| 2007/0181855 A1* | 8/2007 | Nagao et al. ............ 252/500 |
| 2007/0259994 A1 | 11/2007 | Tour et al. |
| 2008/0070041 A1 | 3/2008 | Kuntz et al. |
| 2008/0152896 A1 | 6/2008 | Moorlag et al. |
| 2008/0202369 A1* | 8/2008 | Yu et al. .................. 101/454 |
| 2010/0221526 A1* | 9/2010 | Ueno et al. ................ 428/332 |
| 2010/0243965 A1* | 9/2010 | Korzhenko et al. ........ 252/511 |
| 2011/0183114 A1 | 7/2011 | Kim et al. |

FOREIGN PATENT DOCUMENTS

| | | |
|---|---|---|
| EP | 1942161 | 9/2010 |
| JP | 2007524727 | 8/2007 |
| JP | 2008080801 | 4/2008 |
| JP | 2008155210 | 7/2008 |
| JP | 2008156646 | 7/2008 |
| WO | WO 2005014708 A1 * | 2/2005 |

OTHER PUBLICATIONS

Qi et al., "CNT/Fluoropolymer Coating Composition", U.S. Appl. No. 12/198,460, filed Aug. 26, 2008.

Final Office Action dated Sep. 17, 2014, U.S. Appl. No. 12/603,750, filed Oct. 22, 2009, pp. 1-12.

Non-Final Office Action dated May 8, 2014, U.S. Appl. No. 12/198,460, filed Aug. 26, 2008, pp. 1-25.

* cited by examiner

NANOTUBE REINFORCED FLUORINE-CONTAINING COMPOSITES

FIELD OF THE INVENTION

This invention relates generally to coating compositions and methods for making and using the coating compositions and, more particularly, to nanotube-containing coating compositions and methods for making and coating the nanotube-containing composition used for electrostatographic devices and processes.

BACKGROUND OF THE INVENTION

In current electrostatographic processes, two major types of fuser topcoat materials, e.g., fluoroelastomers and fluoroplastics, are used for the fusing technologies. For example, Viton fluoroelastomers provide good mechanical flexibility with an ability to absorb shock energy and also provide high speed with high print quality, although Viton fusers require a release agent to prevent an offset caused by the low fluorine content nature of the Viton fluoroelastomer. Such use of a release agent, e.g., silicone oil, increases the cost of RAM systems and causes end-use problems because silicone oil often remains on the prints. Oil-less fusing has therefore become more attractive.

Teflon fluoroplastics have high fluorine content and are widely used for oil-less fusing. For example, a fuser including a Teflon topcoat on a silicone elastomer layer may include a Teflon PFA surface that enables oil-less fusing and a conformable silicone layer that enables rough paper fix, low mottle and good uniformity Compared with Viton fluoroelastomers, however, Teflon PFA is easily damaged. In addition, fabrication of PFA topcoat requires harsh processing conditions such as high baking temperatures (e.g., over 350° C.), which can degrade the underlying silicone rubber layer.

Thus, there is a need to overcome these and other problems of the prior art and to provide coating compositions suitable and methods for processing and using the coating compositions.

SUMMARY OF THE INVENTION

According to various embodiments, the present teachings include a coating composition. In one embodiment, the coating composition can include a polymer matrix having one or more cross-linked polymers; as well as a plurality of nanotubes and a plurality of fluorine-containing resin fillers dispersed in the polymer matrix. For example, the plurality of fluorine-containing resin fillers can include a fluorine content by weight of at least about 58%. Such coating composition can be used for, e.g., a fuser member, wherein the coating composition can be used as the outermost layer disposed over a substrate of the fuser member.

According to various embodiments, the present teachings also include a method for making a coating composition In this method, a curable silicone elastomer and/or a fluoropolymer that are semi-soft and/or molten can be mixed with a plurality of nanotubes and a plurality of fluorine-containing resin fillers so as to form a composite The composite can then be mixed with an effective solvent to form a coating dispersion, which is subsequently applied onto a desired substrate and further cured by a heating and/or a radiation depending on the polymers used for the coating composition. In various embodiments, during the formation of the coating composition, mechanical shear force can be used to facilitate the mixing(s) using suitable mechanical processes.

According to various embodiments, the present teachings further include a method for forming the coating composition by first mixing a plurality of nanotubes with a curable silicone elastomer and/or a fluoropolymer that are semi-soft and/or molten using a mechanical shear force to form a composite. Such composite can then be mixed with a plurality of fluorine-containing resin fillers in an effective solvent, followed by an addition of one or more cross-linking agents to form a coating dispersion. For example, the cross-linking agent can include one or more of a bisphenol compound, an diamino compound, an aminophenol compound, an amino-siloxane compound, an amino-silane and a phenol-silane compound. The coating dispersion can then be applied onto a substrate and cured by a heating and/or a radiation according to the polymer(s) and/or the cross-linking agent(s) used for forming the coating composition.

Additional objects and advantages of the invention will be set forth in part in the description which follows., and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1A:
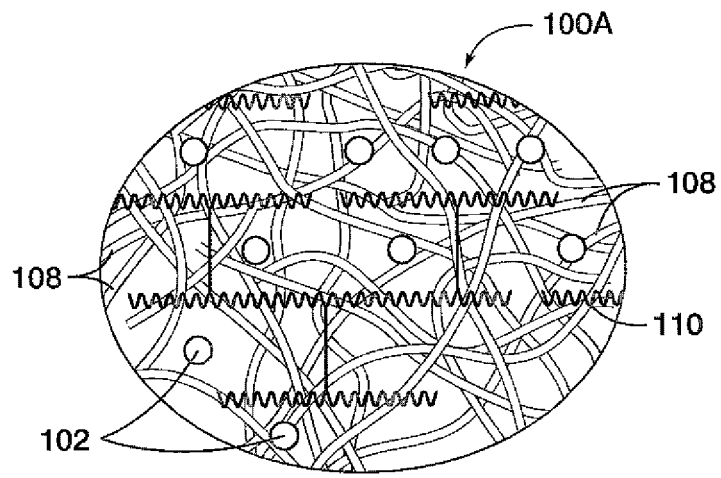
FIG. 1A depicts an exemplary coating composition having a pseudo-fluorine surface in accordance with the present teachings.

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Exemplary embodiments provide coating compositions having pseudo-fluorine surface and methods for processing and using the coating compositions. The coating composition can include, for example, a plurality of fluorine-containing resin fillers and a plurality of nanotubes (e.g., carbon nanotubes (CNTs)) dispersed in a polymer matrix that contains, e.g., one or more cross-linked polymers. The fluorine-containing resin fillers can provide a pseudo-fluorine surface for a low surface energy of the coating composition. The nanotubes can be dispersed in the polymer matrix to provide an improved mechanical robustness of the coating composition. The coating composition can be coated on a member surface, wherein the coated member can be, for example, a fuser member, a fixing member, a pressure roller, or a release agent donor member, used in an electrostatographic printing device or process.

As used herein and unless otherwise specified, the term "fluorine-containing resin fillers" refers any resin fillers that contain atoms of fluorine. The fluorine content can be at least about 58% by weight of the fluorine-containing resin fillers. The "fluorine-containing resin fillers" can be dispersed in a coating composition for providing a pseudo-fluorine surface having a low surface energy of the coating composition. The "fluorine-containing resin fillers" can have at least one minor dimension in the micro- or nano-scale. For example, the fluorine-containing resin fillers can have a minor dimension ranging from about 25 nanometers to about 50 micrometers.

In some embodiments, the fluorine-containing resin fillers can be dispersed in the polymer matrix by a physical bond (e.g., ionic bond, hydrogen bond, or van der walls) or a chemical bond (i.e., covalent bond) with the polymer chain of the polymer matrix. In other embodiments, the fluorine-containing resin fillers can be dispersed randomly or uniformly in the polymer matrix. In exemplary embodiments, the fluorine-containing resin fillers can include fluorine-containing nanoparticles and can be dispersed randomly throughout the polymer matrix by a physical bond or optionally a chemical bond with the cross-linked polymer chain.

In various embodiments, the fluorine-containing resin fillers can be dispersed in the polymer matrix having a weight loading of, for example, about 2% or more by weight of the disclosed coating composition. Other embodiments can use about 2% to about 70%, or about 2% to about 50%, of the fluorine-containing resin fillers by weight of the coating composition.

The "fluorine-containing resin fillers" can include, for example, fluoropolymer particles. Examples of fluoropolymers can include polytetrafluoroethylene (PTFE, e.g., sold by DuPont under the tradename Teflon), perfluoroalkoxy polymer resin (PFA, e.g., sold by DuPont under the tradename Teflon), fluorinated ethylene-propylene, (FEP, e.g., sold by DuPont under the tradename Teflon), polyethylenetetrafluoroethylene (ETFE, e.g., sold by DuPont under the registered tradename Tefzel, or sold by Asahi Glass company under the registered tradename Fluon), polyvinylfluoride (PVF, e.g., sold by DuPont under the registered tradename Tedlar), polyethylenechlorotrifluoroethylene (ECTFE, e.g., sold by Solvay Solexis under the registered tradename Halar), or polyvinylidene fluoride (PVDF, e.g., solde by Arkema under the registered tradename of Kynar).

In various embodiments, the fluorine-containing resin fillers can also include copolymers of tetrafluoroethylene (TFE) and perfluoro(ethyl vinyl ether) (PEVE), compolymers of tetrafluoroethylene (TFE) and perfluoro(methyl vinyl ether) (PMVE) and mixtures thereof.

As used herein and unless otherwise specified, the term "nanotubes" refers to elongated materials (including organic and/or inorganic materials) having at least one minor dimension, for example, width or diameter, about 100 nanometers or less. Although the term "nanotubes" is referred to throughout the description herein for illustrative purposes, it is intended that the term also encompass other elongated structures of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

The term "nanotubes" can also include single wall nanotubes such as single wall carbon nanotubes (SWCNTs), multi-wall nanotubes such as multi-wall carbon nanotubes (MWCNTs), and their various functionalized and derivatized fibril forms such as nanofibers. The term "nanotubes" can further include carbon nanotubes including SWCNTs and/or MWCNTs. Furthermore, the term "nanotubes" can include modified nanotubes from all possible nanotubes described thereabove and their combinations. The modification of the nanotubes can include a physical and/or a chemical modification.

The nanotubes can have various cross sectional shapes, such as, for example, rectangular, polygonal, oval, or circular shape. Accordingly, the nanotubes can have, for example, cylindrical 3-dimensional shapes. For example, carbon nanotubes can usually be considered as one atom thick layers of graphite, called graphene sheets, rolled up into nanometer-sized cylinders, tubes or other shapes In various embodiments, the nanotubes can have an aspect ratio of about 10 to about 1,000,000.

The nanotubes can be formed of conductive or semi-conductive materials. In some embodiments, the nanotubes can be obtained in low and/or high purity dried paper forms or can be purchased in various solutions. In other embodiments, the nanotubes can be available in the as-processed unpurified condition, where a purification process can be subsequently carried out.

The exemplary CNTs can be an allotrope of carbon and can provide exceptional and desired functions, such as, mechanical, electrical (e.g., conductivity), and thermal (e.g., conductivity) functions to the nanotube-containing coating composition and its coated member, such as a fuser member. In various embodiments, the resulting coating composition can possess a volume electrical resistivity of, e.g., about $1 \times 10^8$ ohm-cm or less.

In addition, the nanotubes can be modified/functionalized nanotubes with controlled and/or increased mechanical, electrical or thermal properties through various physical and/or chemical modifications. For example, carbon nanotubes can be surface-modified with a material chosen from perfluorocarbon, perfluoropolyether, and/or polydimethylsiloxane.

The nanotubes, such as carbon nanotubes (CNTs), can be dispersed in the polymer matrix having a weight loading of, for example, about 0.1% to about 40% by weight of the coating composition. Other embodiments can use about 0.1% to about 25% by weight of the coating composition.

The fluorine-containing resin fillers and the nanotubes can be dispersed in the polymer matrix. As used herein, the "polymer matrix" can include one or more cross-linked polymers, such as, for example, fluoroelastomers, polyperfluoroether elastomers, silicone elastomers, thermosetting polymers or other cross-linked materials. In various embodiments, the one or more cross-linked polymers can be semi-soft and/or molten to mix with the nanotubes and/or the fluorine-containing resin fillers.

In various embodiments, the polymer matrix can include fluoroelastomers, e.g., having a monomeric repeat unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and mixtures thereof. Various embodiments can also include effective curing agents, cross-linking agents, bonding agents, or cross-linkers to cross-link polymers forming the polymer matrix. Effective fluoropolymer cross-linking agents can include, e.g., any compound that is capable of reacting with and cross-linking fluoropolymers. Exemplary curing agents or cross-linkers can be bisphenol compounds. An exemplary bisphenol cross-linker can include Viton® Curative No. 50 (VC-50) available from E. I. du Pont de Nemours, Inc. VC-50 can be soluble in a solvent suspension of the CNT and the exemplary fluoropolymer and can be readily available at the reactive sites for cross-linking. Curative VC-50 can contain Bisphenol-AF as a cross-linker and diphenylbenzylphosphonium chloride as an accelerator. Bisphenol-AF is also known as 4,4'-(hexafluoroisopropylidene)diphenol.

Commercially available fluoroelastormer can include, for example, such as Viton A® (copolymers of hexafluoropropylene (HFP) and vinyl idene fluoride (VDF or VF2)), Viton®-B, (terpolymers of tetrafluoroethylene (TFE), vinylidene fluoride (VDF) and hexafluoropropylene (HFP); and Viton®-GF, (tetrapolymers including TFE, VF2, HFP)), as well as Viton E®, Viton E 60C®, Viton E430®, Viton 910®, Viton GH® and Viton GF®. The Viton® designations are Trademarks of E.I. DuPont de Nemours, Inc. Still other commercially available fluoroelastormer can include, for example, Fluorel 2170®, Fluorel 2174®, Fluorel 2176®, Fluorel 2177® and Fluorel LVS 76®, Fluorel® being a Trademark of 3M Company. (Cynthia, Fluorel™ fluoroelastomers became Dyneon™ fluoroelastomers in 1999.) Additional commercially available materials can include Aflas® a poly(propylene-tetrafluoroethylene) and Fluorel II® (LII900) a poly (propylene-tetrafluoroethylenevinylidenefluoride) both also available from 3M Company, as well as the Tecnoflons identified as For-60KIR®, For-LHF®, NM®, For-THF®, For-TFS®, TH®, and TN505®, available from Solvay Solexis. The examples of polyperfluoroether elastomers can include, e.g., SHIN-ETSU SIFEL®, Fluorolink® PFPE from Solvay Solexis.

In one embodiment, the polymer matrix can include a vinylidene-fluoride-containing fluoroelastomer cross-linked with a curing agent, e.g., that is selected from a group consisting of a bisphenol compound, a diamino compound, an aminophenol compound, an amino-siloxane compound, an amino-silane and a phenol-silane compound. In another embodiment, the polymer matrix can include cured silicone elastomers.

Cross-linked fluoropolymers can form elastomers that are relatively soft and display elastic properties. In a specific embodiment, the polymer matrix used for the coating compositions and the coated member can be Viton-GF® (E. I. du Pont de Nemours, Inc.), including tetrafluoroethylene (TFE), hexafluoropropylene (HFP), vinylidene fluoride (VF2), and a brominated peroxide cure site.

In various embodiments, a coating dispersion can be formed, e.g., including fluorine-containing resin fillers, nanotubes, cross-linked polymer(s), and/or curing agents dispersed into an effective solvent to form a stable dispersion/suspension for preparing the coating compositions and the related coated members. In various embodiments, effective solvents can include, but are not limited to, methyl isobutyl ketone (MIBK), acetone, methyl ethyl ketone (MEK), and mixtures thereof. Other solvents that form stable dispersion/suspensions can be within the scope of the embodiments herein and can include those solvents known to one of ordinary skill in the art.

As used herein, the term "dispersion" refers to any system that include one substance being in another, e.g., one substance dissolving in another, or particles or other substance suspending or scattering in a fluid. Thus, for purposes of this application, the term "dispersion" can also herein refer to a "solution", "suspension" or "emulsion". For example, a dispersion can be a two-phase system where one phase includes finely divided particles, often in the colloidal size range, distributed throughout a bulk substance, the particles being the dispersed or internal phase, and the bulk substance the continuous phase. The nanotubes and/or the fluorine-containing resin fillers that are dispersed in a solvent can be an example of a solid-liquid dispersion, while the nanotubes and/or the fluorine-containing resin fillers dispersed in a polymer matrix for a coated member can be an example of a solid-solid dispersion.

In various embodiments, the disclosed coating composition can further include fillers, for example, to improve the hardness and wear resistance. Example of fillers can include spherical particles such as metal oxides, carbon black, and/or carbon fibers.

For ease of illustration, the invention will be described with reference to the coating compositions and the resulting coated members that use, for example, CNTs for the nanotubes, PTFE particles for the fluorine-containing resin fillers, fluoropolymer Viton-GF for the curable polymer, basic oxides for the fillers, VC-50 for the curing agent and MIBK for the solvent. The whole system can be formed through the curing of the Viton-GF elastomer.

Figure 1B:
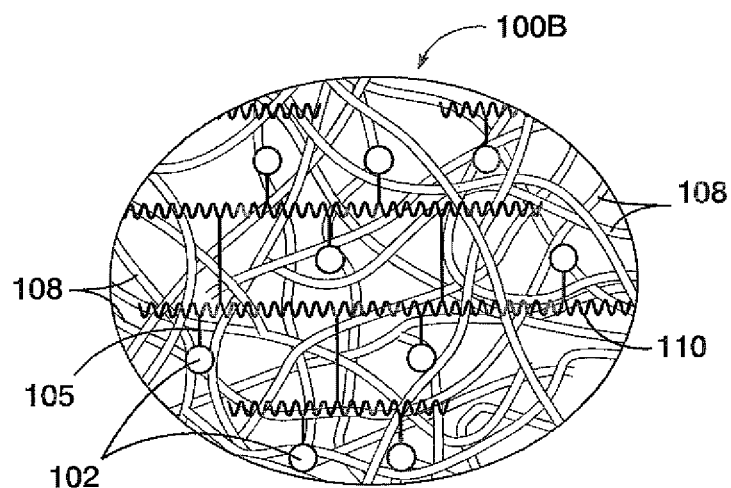
FIG. 1B depicts another exemplary coating composition having a pseudo-fluorine surface in accordance with the present teachings.

FIGS. 1A-1B depict exemplary coating compositions involving fluorine-containing resin fillers and nanotubes in accordance with the present teachings. It should be readily apparent to one of ordinary skill in the art that the coating composition 100A or 100B depicted in FIGS. 1A-1B represents a generalized schematic illustration and that other particles/nanotubes/polymers can be added or existing particles/nanotubes/polymers can be removed or modified.

The coating composition 100A or 100B can include a pseudo-PTFE surface to provide a surface roughness, e.g., for an oil-less process. As shown, the coating composition 100A or 100B can include, for example, PTFE particles 102 dispersed within the Viton matrix 110 that CNTs 108 are uniformly and stably dispersed therein. The PTFE particles 102 can be, e.g., PTFE nanoparticles, and can be distributed in the Viton matrix 110 by a physical bond (see FIG. 1A) or a chemical bond 105 (see FIG. 1B) with the Viton elastomer polymer chain 110.

In various embodiments, the chemical bonding 105 of the PTFE particles 102 with the Viton chain 110 shown in FIG. 1B can provide an increased loading percentage of the PTFE particles 102 for more surface roughness, i.e., lower surface energy. In an exemplary embodiment, the covalently bonded PTFE particles 102 can have a weight loading of about 80% over the weight of the coating composition (see FIG. 1B), while the physically dispersed PTFE particles 102 can have a weight loading of about 20% over the weight of the resulting coating composition (see FIG. 1A). In some embodiments, the PTFE particles 102 can directly react with the Viton chain 110 through a surface modification of the PTFE particles 102. In other embodiments, a coupling agent can be included in the coating composition to covalently bond the PTFE particles 102 with the Viton chain 110.

The disclosed coating compositions can be prepared, for example, by first forming a CNT/Viton composite. In one embodiment, the CNTs can be mixed with the Viton polymer in a dispersion/suspension, wherein the CNTs are substantially uniformly dispersed and substantially non-agglomerated in the Viton-GF polymer. A solid state CNT/Viton composite can then be formed, for example, by a drying process known to one of ordinary skill in the art. In various embodiment, a coupling agent can be used to couple the CNTs with the Viton polymer chain to provide desired loading percentage and thus to provide desired mechanical properties.

In another embodiment, a commercially prepared master batch of CNT/fluoropolymer material can be used and followed by lowering the concentration of CNT using, e.g., a letdown extrusion process. The let-down extrusion process is a high shear mixing method and therefore, provides the coating compositions with substantially non-agglomerated and substantially uniformly dispersed CNTs in Viton polymer in the solid states. In an embodiment, the extrusion can be accomplished with a twin screw extruder.

In various embodiments, the CNT/Viton dispersion can also include, e.g., basic oxides, and/or surfactant prior to mixing with the VC-50 curing agent.

Following the formation of CNT/Viton composite, the composite can be mixed with PTFE particles, such as nano-sized PTFE particles, to form CNT/PTFE/Viton coating dispersion. For example, the CNT/Viton composite prepared above can be mixed with the PTFE particles, more CNTs, the VC-50 curing agent, the metal oxide and/or optionally surfactants in the exemplary effective solvent MIBK to form a CNT/PTFE/Viton coating dispersion for a coating dispersion.

Following the formation of the CNT/PTFE/Viton coating dispersion, the coating composition can then be, e.g., coated, extruded or molded, and further cured to form the disclosed CNT/PTFE/Viton coating composite. In an exemplary embodiment, following the coating and prior to the curing, the effective solvent can be at least partially evaporated. For example, the solvent can be allowed to evaporate for about two hours or longer at a room temperature. Other evaporation times and temperatures can be within the scope of embodiments herein.

Following evaporation the coating can be cured. An exemplary curing process can be a step-wise cure at low temperatures, for example, about 260° C. or lower. In an exemplary embodiment, a coated/extruded/molded member can be placed in a convection oven at about 149° C. for about 2 hours; the temperature can be increased to about 177° C. and further curing can take place for about 2 hours; the temperature can be increased to about 204° C. and the coating can further be cured at that temperature for about 2 hours; lastly, the oven temperature can be increased to about 232° C. and the coating can be cured for another 6 hours. Other curing schedules can be possible. Curing schedules known to those skilled in the art can be within the scope of embodiments herein.

The CNT/PTFE/Viton coated member can be used as, for example, a fuser member, a fixing member, a pressure roller, and/or a release agent donor member in an electrostatographic printing device and process. For example, the member surface to be coated can include a substrate for all possible members described thereabove. The substrate can be in a form including, but not limited to, a belt plate, and/or cylindrical drum. In various embodiments, the member surface to be coated can include one or more layers formed on a substrate prior to the coating process. In various embodiments, the member surface to be coated can include a wide variety of materials, such as, for example, metals, metal alloys, rubbers, glass, ceramics, plastics, or fabrics. In certain embodiments, the member surface to be coated can include, e.g., aluminum cylinders or aluminum fuser rolls having silicone rubber formed on an aluminum cylinder.

Various coating techniques can be applied to form the disclosed composite coated member. As used herein, the term "coating technique" refers to a technique or a process for applying, forming, or depositing the coating composition on a material or a surface. Therefore, the term "coating" or "coating technique" is not particularly limited in the present teachings, and dip coating, painting, brush coating, roller coating, pad application, spray coating, spin coating, casting, or flow coating can be employed. For example, the coating dispersion can be coated on a piece of silicon wafer by spray-coating with an air-brush. In various embodiments, gap coating can be used to coat a flat substrate, such as a belt or plate, whereas flow coating can be used to coat a cylindrical substrate, such as a drum or fuser roll or fuser member substrate. After the exemplary CNT/PTFE/Viton coating dispersion is coated on the desired member surface, a curing process can be performed.

In this manner, various embodiments can therefore include a method for forming the coating composition by first mixing the nanotubes with, e.g., a curable silicone elastomer and/or a fluoropolymer that are semi-soft and/or molten using a mechanical shear force to form a composite. Such composite can then be mixed with the fluorine-containing resin fillers (e.g., PTFE) in the effective solvent, followed by an addition of one or more cross-linking agents to form the coating dispersion. For example, the cross-linking agent can include a bisphenol compound, an diamino compound, an aminophenol compound, an amino-siloxane compound, an amino-silane and/or a phenol-silane compound. The coating dispersion can then be applied onto a substrate and cured by a heating and/or a radiation according to the used curable polymer and/or the cross-linking agent.

In various embodiments, another method for making a coating composition can be included. For example, in this method, the nanotubes and the fluorine-containing resin fillers can be mixed with a curable silicone elastomer and/or a fluoropolymer that is semi-soft and/or molten so as to form a composite. Such composite can then be mixed with an effective solvent as described herein to form a coating dispersion, which is subsequently applied onto a desired substrate and cured by a heating and/or a radiation depending on the used curable polymers. In various embodiments, mechanical shear force can also be used to facilitate the mixing(s) during the formation of the coating composition using suitable mechanical processes that may be known to one of ordinary skill in the art.

Figure 2A:
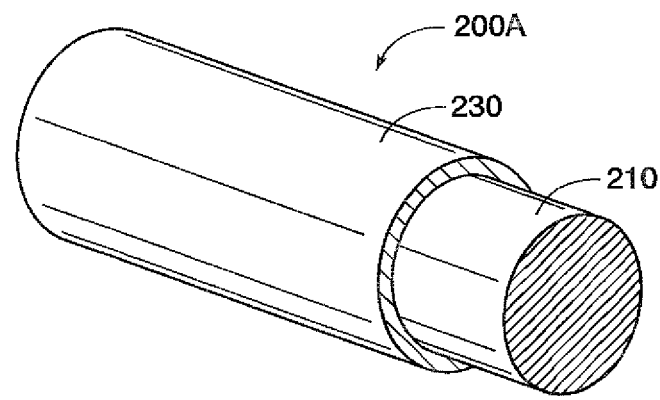
FIG. 2A depicts an exemplary coated member using the coating compositions as shown in FIGS. 1A-1B in accordance with the present teachings.
Figure 2B:
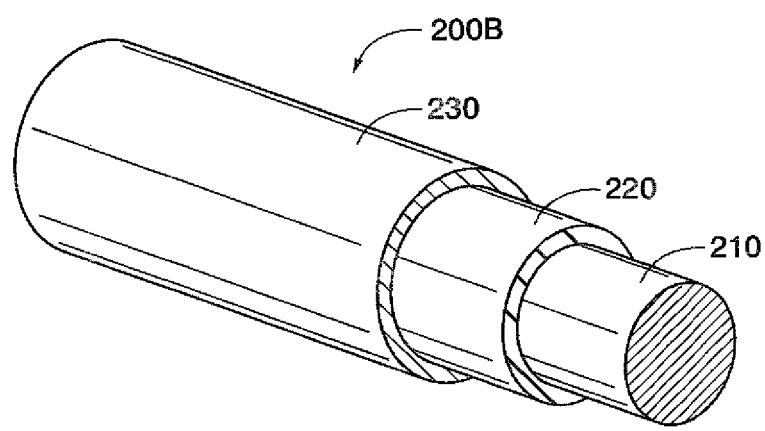
FIG. 2B depicts another exemplary coated member using the coating compositions as shown in FIGS. 1A-1B in accordance with the present teachings.

FIGS. 2A-2B depict exemplary coated members 200A-B having pseudo-PTFE surfaces as shown in FIGS. 1A-1B in accordance with the present teachings. It should be readily apparent to one of ordinary skill in the art that the devices 200A or 200B depicted in FIGS. 2A-2B represents generalized schematic illustration and that other layers/substrates can be added or existing layers/substrates can be removed or modified.

The coated member 200A or 200B can be, e.g., fuser rollers with one or more functional layers 220 and/or 230 formed on an exemplary core substrate 210. In various embodiments, the core substrate 210 can take the form of a cylindrical tube or a solid cylindrical shaft. One of ordinary skill in the art will understand that other substrate forms, e.g., a belt substrate, can be used to maintain rigidity, structural integrity of the coated member.

As shown, the outermost layers 230 in FIG. 2A, and in FIG. 2B can be a coated layer formed from the coating dispersion as disclosed herein. The coated layer can include, for example, the CNT/PTFE/Viton coating composition. In various embodiments, the coated layer can be formed directly on the substrate surface 210 (see 230 in FIG. 2A) or can be formed on a functional layer 220 that is formed on the substrate surface 210 (see 230 in FIG. 2B). For example, the fuser member can be in a 2-layer configuration having a compliant layer 220, such as an optional elastic layer of a silicone rubber layer, disposed between the coated outermost layer 230 and the core substrate 210, such as a metal used in the related art.

In an exemplary embodiment, the outermost layer 230 can include, e.g., a plurality of carbon nanotubes in an amount from about 0.1% to about 25% by weight of the layer 230; and a plurality of fluorine-containing resin fillers in an amount of from about 2% to about 50% by weight of the outermost layer 230.

In various embodiments, the outermost layer 230 can have a tensile strength of about 600 psi to about 3000 psi, and a tensile strain of about 100% to about 600%, wherein the tensile strength and the tensile strain can be measured on the specimens, i.e., the outermost layer 230, using, for example, a universal Istron testing machine (Istron, Norwood, Mass.).

In various embodiments, the outermost layer 230 can have a volume electrical resistivity of about $1 \times 10^6$ ohm-cm or less. The volume electrical resistivity of the outermost layer 230 can be a stable resistivity. For example, a decrease in volume electrical resistivity of the coated outermost layer can be about 5% or less under a compression of about 50 psi to about 200 psi.

In various embodiments, the outermost layer 230 can have a thermal conductivity of about 0.2 W/mK or greater and a thermal diffusivity of about 0.05 cm$^2$/s or greater at a temperature ranging from about 100° C. to about 200° C.

In various embodiments, the outermost layer 230 can have a surface free energy of about 20 mN/m or less, wherein the surface free energy can be calculated, e.g., by using Lewis Acid-Base method from the results of the contact angle measurement using Fibro DAT1100 instrument.

EXAMPLES

Example 1

Preparation of a CNT/Viton Composite

About 28.83 grams of CNT masterbatch (containing 12 weight % of multi-walled CNT in Viton GF) and 29.17 grams of Viton GF (available from E. I. du Pont de Nemours, Inc.) were heated to about 170° C. and extruded using a twin screw extruder at a rotor speed of about 20 revolutions per minute (rpm) for about 20 minutes to form about 50 grams of polymer composite containing about 5 weight percent of carbon nanotubes. Different CNT loadings were prepared by this extrusion let-down process.

Example 2

Preparation of a CNT/PTFE/Viton Coating Composite

A CNT/PTFE/Viton coating dispersion was prepared by mixing the let-down CNT/Viton composite prepared from example 1 with 3 wt % CNT loading, 20 wt % PTFE particles, the metal oxides (magnesium oxide and calcium hydroxide), and the bisphenol VC-50 curing agent (Viton® Curative No. 50 available from E. I. du Pont de Nemours, Inc.) in methyl isobutyl ketone (MIBK). The resulted coating dispersion was then coated onto a suitable fuser roll substrate by, e.g., a flow coating technique, or casting in a mold. The coating was allowed to evaporate most of the solvent, followed by curing at ramp temperatures, e.g., at about 149° C. for about 2 hours, and at about 177° C. for about 2 hours, then at about 204° C. for about 2 hours and then at about 232° C. for about 6 hours for a post cure.

The resulting CNT/PTFE/Viton composite coatings or coated layers exhibited high tensile strength and toughness compared with the PTFE/Viton composite without CNT. Table 1 shows the comparison between them in accordance with the present teachings. Note that, the toughness described in Table 1 is determined by an integral average stress/strain at the break point, that is, the area under the stress-strain curve is considered to be a measure for the toughness as known to one of ordinary skill in the art

TABLE 1

| Sample Description | Film Thickness (mil) | Stress at Break (psi) | Strain at Break (%) | Integral average stress | Initial Modulus (psi) | Toughness (in lb f/in3) |
|---|---|---|---|---|---|---|
| 20% PTFE-Viton | 46 | 590.61 | 191.03 | 358.1 | 970.46 | 684.28 |
| 20% PTFE-Viton-3% CNT | 35 | 1218.63 | 319.38 | 605.58 | 594.01 | 1934.72 |

Other properties were also measured for the prepared CNT/PTFE/Viton composite coatings or coated layers. For example, the thermal diffusivity of the CNT/PTFE/Viton coating composition was measured by NanoFlash and a sample with 3% CNT by weight of the coating composition showed a thermal diffusivity of about 0.071 mm$^2$/s at 200° C.

The surface electrical resistivity of the sample containing 3% CNT was measured of about $1.2 \times 10^4$ O/sq.

Example 3

Preparation of a CNT/PFA/Viton Coating Composition

About 5 grams of PFA powder (in particular, a perfluoro (ethyl vinyl ether) (PEVE) powder, sold as MP320, available from E. I. du Pont de Nemours, Inc.) were mixed with 45 grams of let-down CNT/Viton composite prepared from example 1 with 2 wt % CNT loading and the mixture was extruded using a twin screw extruder at a rotor speed of about 20 revolutions per minute (rpm) and at a temperature of about 170° C. for about 20 minutes to form about 50 grams of CNT/PFA/ Viton composite containing about 10 percent of PFA particles by weight. Different PFA particle loadings were prepared by this extrusion let-down process.

A CNT/PFA/Viton coating dispersion was prepared by mixing the let-down CNT/PFA/Viton composite, the metal oxides (magnesium oxide and calcium hydroxide), and the bisphenol VC-50 curing agent (Viton® Curative No. 50 available from E. I. du Pont de Nemours, Inc.) in methyl isobutyl ketone (MIBK). There were three liquids used, including water, formamide, and diiodomethane, for preparing the coating dispersion. The resulted coating dispersion was then coated onto a substrate, e.g., a fuser roll containing a metal core and an elastic layer by, e.g., a flow coating technique, or casting in a mold. The coating was allowed to evaporate most of the solvent, followed by curing at ramp temperatures, e.g., at about 149° C. for about 2 hours, and at about 177° C. for about 2 hours, then at about 204° C. for about 2 hours and then at about 232° C. for about 6 hours for a post cure.

The coatings were polished by 200-Grit sand paper and the micro-texture was created. The micro-texture combined with the low surface energy fluorinated materials offers low surface free energy of the coatings.

Table 2 summarizes the mechanical and surface free energy properties for the resulting CNT/PFA/Viton coating compositions or coated layers, wherein the coating composition exhibited high tensile strength and toughness, as well as low surface free energy. Surface free energy was calculated by using Lewis Acid-Base method from the results of the contact angle measurement using Fibro DAT1100 instrument.

TABLE 2

| Sample Description | Film Thickness (mil) | Stress at Break (psi) | Strain at Break (%) | Toughness (in lb f/in³) | Initial Modulus (psi) | Surface Free Energy (mN/m²) Polished surface |
|---|---|---|---|---|---|---|
| 2% CNT-Viton | 16 | 1065.73 | 265.35 | 1139.87 | 664.51 | 16.5 |
| 10% PEVE-2% CNT-Viton | 17 | 1096.62 | 277.56 | 1305.17 | 559.45 | 14.2 |
| 20% PEVE-2% CNT-Viton | 13 | 1005.07 | 234.82 | 1196.01 | 654.9 | 12.0 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electorstatographic printing device comprising:
a component positioned in the electrostatographic printing device, the component chosen from a fuser member and a fixing member, the component including an outer coating composition formed thereon, the coating composition comprising:
a polymer matrix, wherein the polymer matrix comprises a fluoroelastomer comprising tetrafluoroethylene units, hexafluoropropylene units and vinylidene fluoride units, wherein the fluoroelastomer is crosslinked with a bisphonol curing agent; and
a plurality of nanotubes and a plurality of fluoride-containing resin filler dispersed in the polymer matrix wherein the plurality of fluorine-containing resin fillers-compromise one or more materials selected from the group consisting of plytetrafluoroethylene (PTFE), perfluoroalkoxy polymer resin (PFA), polyetheylenentetrafluoroethylene (PETFE), copolymers of tetrafluoroethylene (TFE) and perfluoro(ethyl vinyl ether) (PEVE), copolymers of tetrafluoroethylene (TFE) and perfluoro(methyl vinyl ether) (PMVE), copolymers of hexafluoropropylene (HFP) and vinylidene fluoride (VDF or VF2), terpolymers of tetrafluoroethylene (TFE), vinylidene fluoride (VDF) and hexafluoropropylene (HFP), and terpolymers of TFE, VF2, and HFP,
wherein each of the plurality of nanotubes comprises a single wall carbon nanotube (SWCNT) or a multi-wall carbon nanotube (MWCNT), each carbon nanotube having an aspect ratio ranging from about 10 to about 1,000,000;
wherein the plurality of fluorine-containing resin fillers is present in an amount ranging from about 70% to about 80% by weight of the coating composition, and
wherein a surface of the outer coating composition comprises a micro-texture in addition to any roughening of the surface provided by the fluoride containing fillers, the micro-texture combined with the fluoride-containing resin fillers providing a lower surface free energy than a surface free energy of the same outer coating composition without the micro-texture;
wherein the electrostatographic printing device is configured to employ the micro-textured surface for oil-less processing during electrostatographic printing.

2. The electorstatographic printing device of claim 1, wherein each of the plurality of nanotubes comprises a carbon nanotube that is surface-modified with one or more of a perfluorocarbon, a perfluoropolyether, and a polydimethylsiloxane.

3. The electrostatographic printing device of claim 1, wherein each of the plurality of fluorine-containing resin fillers range in size from about 25 nanometers to about 50 micrometers.

4. The electrostatographic printing device of claim 1, wherein the plurality of nanotubes is present in an amount ranging from about 0.1% to about 25% by weight of the coating composition.

5. The electrostatographic printing device of claim 1, wherein the coating composition possesses a volume electrical resistivity of about $1 \times 10^8$ ohm-cm or less.

6. The electrostatographic printing device of claim 1, further comprising an additional filler in addition to the fluorine containing resin filler, the additional filler being selected from the group consisting of metal oxides, carbon black, and carbon fibers.

7. The electrostatographic printing device of claim 6, wherein the additional filler is a metal oxide selected from the group consisting of magnesium oxide and calcium hydroxide.

8. The electrostatographic printing device of claim 7, wherein the fluorine-containing resin fillers comprise one or more materials selected from the group consisting of copolymers of hexafluoropropylene (HFP) and vinylidene fluoride (VDF or VF2), terpolymers of tetrafluoroethylene (TFE), vinylidene fluoride (VDF) and hexafluoropropylene (HFP), and terpolymers of TFE, VF2, and HFP.

9. The fuser member of claim 7, wherein the fluorine-containing resin fillers comprise one or more materials selected from the group consisting of perfluoro(ethyl vinyl ether) (PEVE) and copolymers of tetrafluoroethylene (TFE) and perfluoro(ethyl vinyl ether) (PEVE).

10. An electrostatographic printing device comprising:
a fuser member positioned in the electrostatographic printing device, the fuser member comprising:
a substrate;
an optional elastic layer disposed over the substrate; and
an outermost layer disposed over the substrate, the outermost layer comprising:
a polymer matrix, wherein the polymer matrix comprises a fluoroelastomer comprising tetrafluoroethylene units, hexafluoropropylene units and vinylidene fluoride units, wherein the fluoroelastomer is crosslinked with a bisphenol curing agent; and
a plurality of nanotubes and a plurality of fluorine-containing resin fillers dispersed in the polymer matrix wherein the plurality of fluorine containing resin fillers comprise polytetrafluoroethylene (PTFE),
wherein each of the plurality of nanotubes comprises a single wall carbon nanotube (SWCNT) or a multi-wall carbon nanotube (MWCNT), each carbon nanotube having an aspect ratio ranging from about 10 to about 1,000,000; and
wherein the plurality of fluorine-containing resin fillers are present in an amount ranging from about 70% to about 80% by weight of the outermost layer; and
wherein a surface of the outermost layer comprises a micro-texture in addition to any roughening of the surface provided by the fluorine containing fillers, the micro-texture combined with the fluorine-containing resin fillers providing a lower surface free energy than a surface free energy of the same outer layer without the micro-texture; and
wherein the electrostatographic printing device is configured to employ the micro-textured surface of the fuser member for oil-less fusing.

11. The electrostatographic printing device of claim 10, wherein the outermost layer has a tensile strength of about 600 psi to about 3000 psi and has a tensile strain of about 100% to about 600%.

12. The electrostatographic printing device of claim 10, wherein the outermost layer has a volume electrical resistivity of about $1 \times 10^6$ ohm-cm or less.

13. The electrostatographic printing device of claim 12, further comprising a decrease in the volume electrical resistivity of the outermost layer of about 5% or less under a compression from about 50 psi to about 200 psi.

14. The electrostatographic printing device of claim 10, wherein the outermost layer has a thermal conductivity of about 0.2 W/mK or greater.

15. The electrostatographic printing device of claim 10, wherein the outermost layer has a thermal diffusivity of about 0.05 cm²/s or greater at a temperature ranging from about 100° C. to about 200° C.

16. The electrostatographic printing device of claim 10, wherein the outermost layer comprises,
the plurality of carbon nanotubes in an amount ranging from about 0.5% to about 10% by weight of the outermost layer.

17. An electrostatographic fuser member comprising:
a substrate;
an optional elastic layer disposed over the substrate; and
an outermost layer disposed over the substrate, the outermost layer comprising:
a polymer matrix, wherein the polymer matrix comprises one or more cured polymers selected from the group consisting of silicone elastomers, polyperfluoroether elastomers, and fluoroelastomers; and
a plurality of nanotubes and a plurality of fluorine-containing resin fillers dispersed in the polymer matrix, the fluorine-containing resin fillers comprising a fluorine content by weight of at least 58%, the plurality of fluorine-containing resin fillers having a weight loading ranging from about 70% to about 80% based on the weight of the outermost layer, the fluorine-containing resin fillers forming a pseudo fluorine-containing resin filler surface having a surface free energy of 20 mN/m or less on the outermost layer so that the electrostatographic fuser is suitable for oil-less fusing,
wherein the plurality of fluorine-containing resin fillers comprise one or more materials selected from the group consisting of polytetrafluoroethylene (PTFE), perfluoroalkoxy polymer resin (PFA), polyethylene-tetrafluoroethylene (PETFE), copolymers of tetrafluoroethylene (TFE) and perfluoro(ethyl vinyl ether) (PEVE), copolymers of tetrafluoroethylene (TFE) and perfluoro(methyl vinyl ether) (PMVE), copolymers of hexafluoropropylene (HFP) and vinylidene fluoride (VDF or VF2), terpolymers of tetrafluoroethylene (TFE), vinylidene fluoride (VDF) and hexafluoropropylene (HFP), and terpolymers of TFE, VF2, and HFP;
wherein the plurality of fluorine-containing resin fillers are covalently bonded to the polymer matrix, and
wherein each of the plurality of nanotubes has a weight loading in an amount ranging from about 0.5% to about 10% by weight of the outermost layer.

18. The fuser member of claim 17, wherein the polymer matrix comprises a fluoroelastomer comprising tetrafluoroethylene units, hexafluoropropylene units and vinylidene fluoride units, wherein the fluoroelastomer is crosslinked with a bisphenol curing agent.

19. The fuser member of claim 18, wherein a surface of the outermost layer comprises a micro-texture in addition to any roughening of the surface provided by the fluorine-containing fillers.

20. The fuser member of claim 19, wherein the fluorine-containing resin fillers comprise copolymers of tetrafluoroethylene (TFE) and perfluoro(ethyl vinyl ether) (PEVE).

\* \* \* \* \*